United States Patent [19] [11] Patent Number: 4,904,891
Baker et al. [45] Date of Patent: Feb. 27, 1990

[54] VENTILATED ELECTRIC MOTOR ASSEMBLY

[75] Inventors: Gerald N. Baker; Barry M. Newberg, both of St. Louis, Mo.

[73] Assignee: Emerson Electric Co., St. Louis, Mo.

[21] Appl. No.: 227,145

[22] Filed: Aug. 2, 1988

[51] Int. Cl.$^4$ ............................................. H02K 9/00
[52] U.S. Cl. .................................... 310/62; 310/63; 310/89
[58] Field of Search ................... 310/62, 63, 89, 90, 310/43, 157, 91; 416/183, 93 R; 417/368

[56] References Cited

U.S. PATENT DOCUMENTS

| 3,622,821 | 11/1971 | Maffey, Jr. | 310/90 |
| 4,306,168 | 12/1981 | Peachee | 310/91 |
| 4,670,677 | 6/1987 | Snider | 310/63 |
| 4,757,221 | 6/1988 | Kurihashi | 310/89 |

FOREIGN PATENT DOCUMENTS

| 0607551 | 1/1935 | Fed. Rep. of Germany | 310/63 |
| 0198397 | 12/1982 | Japan | 416/183 |
| 0741377 | 6/1980 | U.S.S.R. | 310/63 |
| 1444646 | 8/1976 | United Kingdom | 310/63 |

Primary Examiner—R. Skudy
Attorney, Agent, or Firm—Polster, Polster and Lucchesi

[57] ABSTRACT

An electric motor ventilation structure having an interior fan with a dual concentric set of radially disposed blades located within an endshield of said motor in close proximity to the end of the rotor and stator assemblies within said endshield and to the other peripheral surfaces of said stator assembly within that endshield. The disposition of said blades is such as to break the hot air boundary layer adjacent to each of said windings and cause the movement of heated air through the axial and radial endshield apertures to the external environment and replenishment with cooler air from that environment during motor operation.

17 Claims, 3 Drawing Sheets

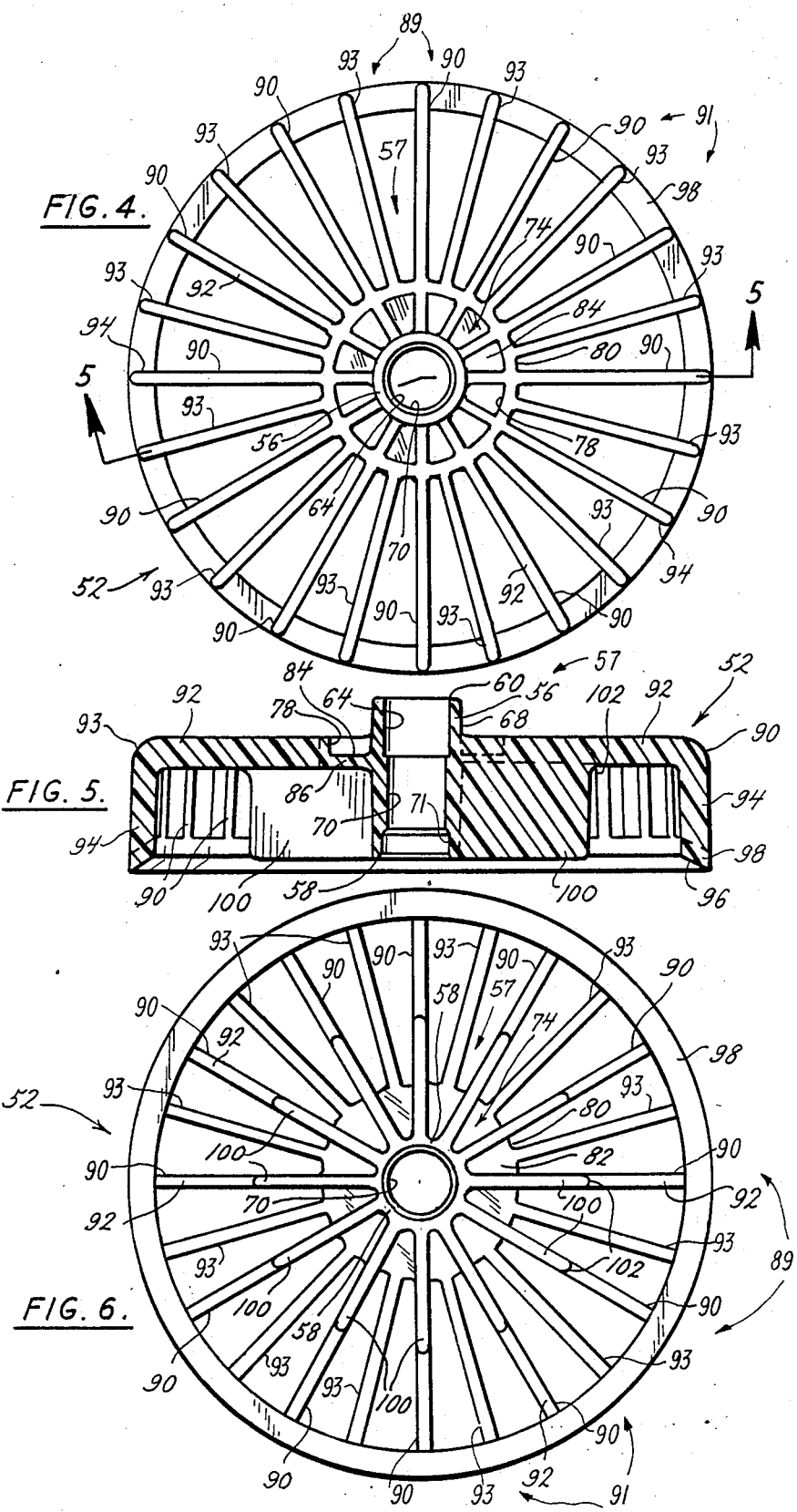

VENTILATED ELECTRIC MOTOR ASSEMBLY

BACKGROUND OF THE INVENTION

The present invention relates to an electric motor structure and particularly to an electric motor structure providing optimum ventilation for a reversing motor used in a clothes washer application.

The present invention combines a ventilation structure for the motor with an internal fan to move air from within the motor to the environment external to the motor. The invention is particularly directed to reversing electric motors used in clothes washer applications. Historically, a number of different types of motors have been used for such applications. Although the invention is described with respect to a particular application involving a reversing, permanent split-capacitor motor, it will be understood by those skilled in the art that other types of motor applications can take advantage of the ventilation structure of the present invention.

A discussion of the types of motors used in clothes washer applications where reversing operation is required is fully discussed in copending application entitled METHOD OF DESIGNING REVERSING PSC MOTORS, Serial No. 227,146, filed Aug. 2, 1988, and assigned to the assignee of the present invention, the disclosure of which is incorporated by reference herein. Typically a problem to be addressed in reversing motors is that as a result of their frequent reversal of direction, during the course of normal operation, the motors and their accompanying ventilation means, such as fans, are not able to get up to speed after each change in direction sufficiently to remove air heated as a result of current surges through the rotor and stator windings of the motor. A motor operating in one direction normally sustains a current surge in its stator winding which is accompanied by a flux coupled current in the rotor winding when power is initially applied. Once the motor achieves steady state operation, power consumption of the motor reaches a steady state level at something less than the initial surge. The fact that the motor is turning in one direction and quickly gets up to speed, usually results in the necessary cooling being achieved by the ventilating devices provided. Such devices include openings in the motor housing to permit air flow therethrough, and internal or external fans mounted on the rotor shaft of the motor to move air, heated by the currents in the windings, away from the windings. As mentioned above, in a motor that is reversing directions frequently, there is no real steady state operation in the same sense as there is in the case of a motor turning in only one direction. Thus, the reversing motor sustains frequent current surges and heat builds up to levels considerably higher than those sustained by a motor turning in only one direction.

In order to preserve the windings in the motor, and prevent deleterious effects from the heat generated as a result of the reversing operation, special design techniques are demanded. Specifically, unique means for assembling the motor structure to maximize heat transfer away from the core of the motor, including its windings, and means for pushing or pulling air through the motor structure to enhance the cooling; for example, by creating thermal differentials between the internal and external environments, are necessary. It should also be noted, that in clothes washer applications of motors, there are typically space limitations which frequently dictate the physical size of the motor. That is, application space limitations often restrict the physical size of the motor or prevent the use of external fans, because these expedients increase the demand for space in the motor mounting area of the washing machine. Also, although the physical size of the motor and the selection of materials with which to fabricate the heat conducting elements of the motor housing are variables that typically permit some latitude in the motor design, where space limitations are not critical; where space limitations are present, and where weight is a consideration, it is important to have a motor design that can be lighter weight and made with less expensive materials which are still competent for heat transfer purposes when incorporated in an appropriate ventilation configuration. The present invention provides the combination of structure, materials, and elements to achieve the desired results.

In the present invention, two metal endshields are an integral part of the motor housing assembly. In addition, one of the endshields includes an integral mounting bracket means which contributes, along with the mass of the opposing endshield, to the heat transfer structure of the motor. These elements, of course, are capable of picking up heat transferred from the rotor and stator windings directly, and by way of the surrounding air within the endshields; the heat transfer being both by conduction and convection. By conduction, the endshields pick up heat from the stator laminations. By convection, the endshields pick up heat from the environment immediately adjacent to the windings and the stator laminations. In the case of the endshield with a mounting bracket for installing the motor to the structure of the washing machine, the heat transfer is by conduction through adjoining structure, and by convection to the surrounding air. The other endshield, of course, communicates heat to the surrounding environment by convection. Apertures located axially in the end walls of both endshields, and radial apertures in the peripheral walls of both endshields, enhance the communication of heated air from inside the motor to the external environment. A unique fan is located within the endshield having the integral mounting bracket, to further enhance the communication of heated air from within the motor structure to the external environment. Within the boundaries of the endshield in which it resides, this fan has blades which extend around the outer periphery of the stator winding, and additionally extend down towards the adjacent end of the rotor winding within the stator assembly, to break the thermal boundary layer of heated air which exists in the rotor cavity within the stator assembly. It is this thermal boundary layer which, in effect, remains mostly intact in the case of a motor that is reversing directions frequently, as is the case in a clothes washer application. Thus, the heated air that remains in close association within the stator winding cavity adjacent to the end of the rotor, is maintained in a high temperature condition, unless something is done to disrupt it. The fan of the present invention reaches down and around the top and sides of the stator assembly windings and towards the top of the rotor assembly, in close proximity therewith, to disrupt the hot air build up within the cavity and the adjacent windings. Not only does the fan disrupt this otherwise mostly undisturbed hot air buildup, but it causes the heated air to be moved so that it flows axially and radially out of the endshield surrounding that particular end of the motor. All of this is accomplished within a confined space, in what is normally anticipated to be a warm ambient applications environment.

SUMMARY OF THE INVENTION

It is thus an object of the present invention to provide optimum cooling for a reversing motor employed in a clothes washer application in a normally warm ambient environment. It is another object of the present invention to employ the structure of the reversing motor in such a way as to enhance the capacity of the motor to direct heated air created during the course of the motor reversing operation, from within the motor to the external environment. It is yet another object of the present invention to provide internal cooling by means of a fan juxtaposed with heat generating functional elements within the motor structure, to enhance the cooling capability of the motor. It is still another object of the present invention to achieve maximum heat transfer from within a reversing motor by appropriate selection and use of materials in the motor design to achieve maximum heat transfer from within the motor to the external environment. It is yet another object of the invention to combine a reversing motor structure utilizing a minimum amount of material with an internal fan means to maximize heat transfer from the motor to the external environment. And finally, it is an object of the present invention to provide an effective heat transfer and motor ventilation structure that is simple and inexpensive to manufacture.

The present invention provides a ventilated electric motor assembly including of a rotor assembly rotatably disposed within a stator assembly and mounted upon a rotor shaft. Endshield structures are at opposite ends of the motor assembly and are attached to the stator assembly on opposite sides of a stator lamination stack. Each endshield has an end wall side wall containing apertures to permit the flow of heated air from within the motor assembly to the external environment. The rotor shaft is journaled within in suitable bearing assemblies and extends outward from a motor housing for the purpose of affixing a pulley to it. The pulley is connected to the drive mechanism of a washing machine by means of a belt, for example. A fan is mounted upon the rotor shaft inside the motor housing. This unique fan has two sets of blades radiating outward from a hub mounted upon the rotor shaft. One set contains L-shaped blades which extend radially outwards and over an end wall of the endshield and around the outer periphery of the stator winding, to move heated air away from that winding surface. A second set of blades extend radially outward from the hub to an intermediate point between the hub and the outer periphery of the fan. Those blades then extend downwardly. This second set of blades is used to break the thermal boundary of heated air within the rotor cavity; and particularly in the area adjacent to the top of the rotor, in proximity with the blades, and the interior of the stator windings adjacent to the top of the rotor assembly. The unique fan design permits efficient removal of heated air from about and around the end of the rotor and stator assemblies. The heated air disrupted by the action of the fan blades, during the reversing operation of the motor, flows through the apertures in the side wall of the endshield to the external environment.

BRIEF DESCRIPTION OF THE DRAWINGS

Referring to the drawings which disclose one particular embodiment of the present invention:

FIG. 4 is a top view of the fan used within the present invention.

FIG. 5 is a partially rotated sectional view of the fan used in the present invention taken along line 5—5 in FIG. 4.

FIG. 6 is a bottom view of the fan of the present invention.

DESCRIPTION OF THE PREFERRED EMBODIMENT

Figure 1:
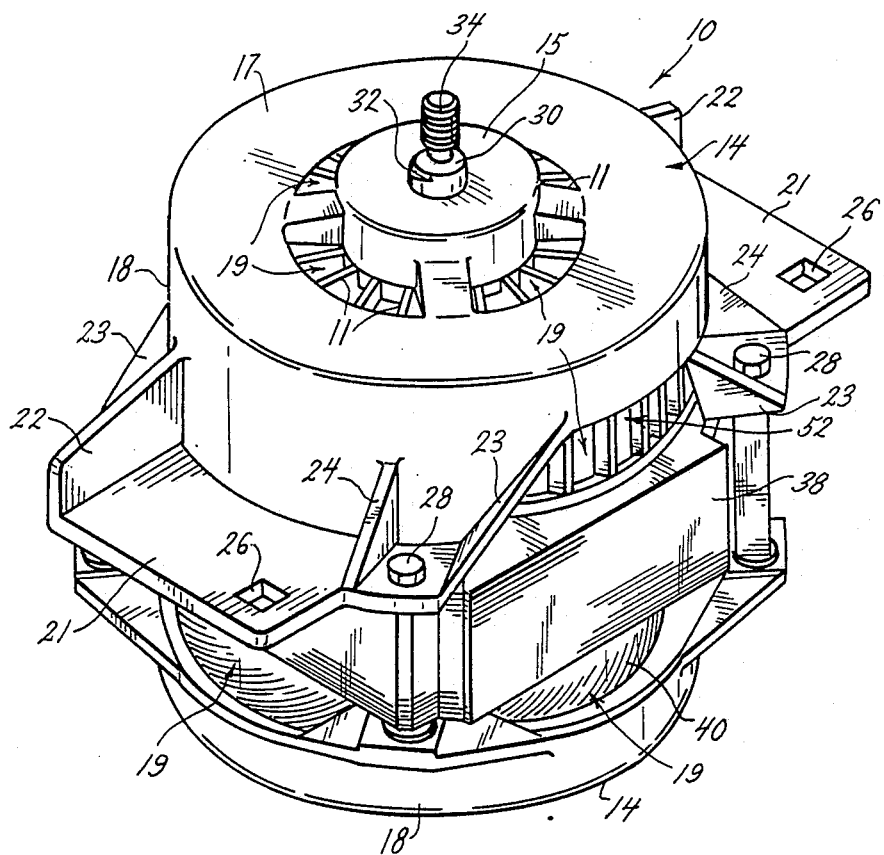
FIG. 1 is a perspective view of the overall motor assembly including the ventilation system of this motor invention.

Referring now to FIG. 1, a motor 10 having a ventilation system of this invention, is shown as including a pair of endshields 14 the endshields are joined through the laminations of a stator assembly 38. This is accomplished by stator mounting bolts 28 which connect through at least one flange 23. Four such flanges are integrally formed with each of the endshields 14. Each of the endshields 14 has a plurality of apertures 19 formed in it, these apertures being formed in the end wall and side wall of the endshield. An integral bearing housing 15 and the apertures 19 in the end wall 17 of one endshield 14 are shown in FIG. 1. The bearing housing 15 shown in FIG. 1 is centrally located and is attached to end wall 17 of the endshield 14 by radially extending equidistantly spaced arms 11. The endshields 14 may be similar to one another, or they may have different designs. For example, the outer face of bearing housing 15 on the other endshield 14 is flush with the end wall surface 17 of the endshield (see FIG. 3). The designs are different from one another in the embodiment illustrated. Like numerals are employed for like functional parts, where appropriate; although the specific designs of the part may vary in the respective endshields 14. The flanges 23 extend outwardly of a peripheral side wall 18 of the endshield 14 and, as shown in FIG. 1, extend downwardly to the uppermost lamination layer of stator assembly 38. A pair of opposed brackets 21 extend outwardly from the base of the side wall 18 of the upper endshield shown in FIG. 1. The brackets are strengthened by gussets 22. Each bracket 21 has a square mounting hole 26 for attaching the motor assembly to, for example, a washing machine structure (not shown) with which it is to be functionally and operatively associated. Stiffening webs 24 offer additional strength to the mounting brackets.

Figure 2:
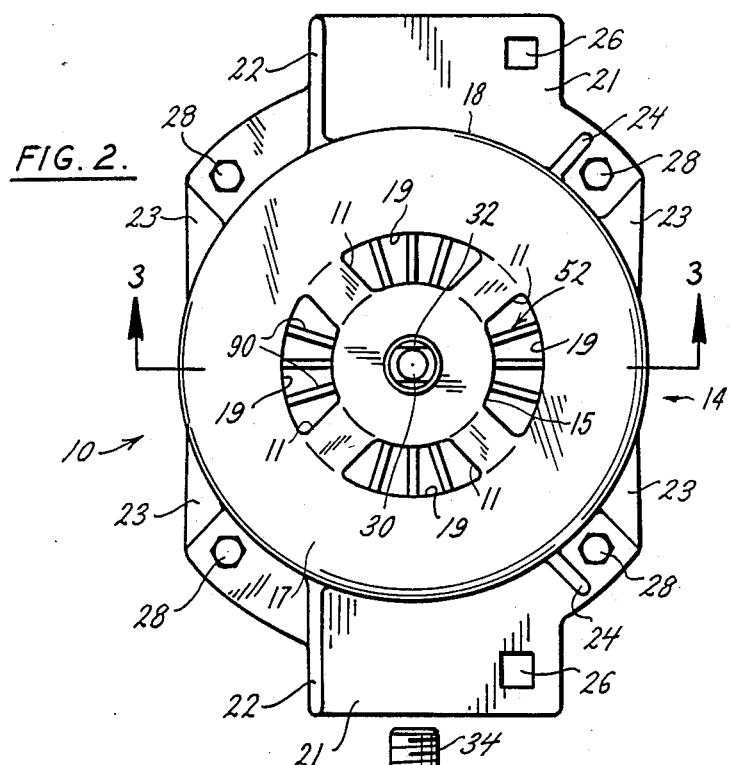
FIG. 2 is a top view of the motor shown in FIG. 1.
Figure 3:
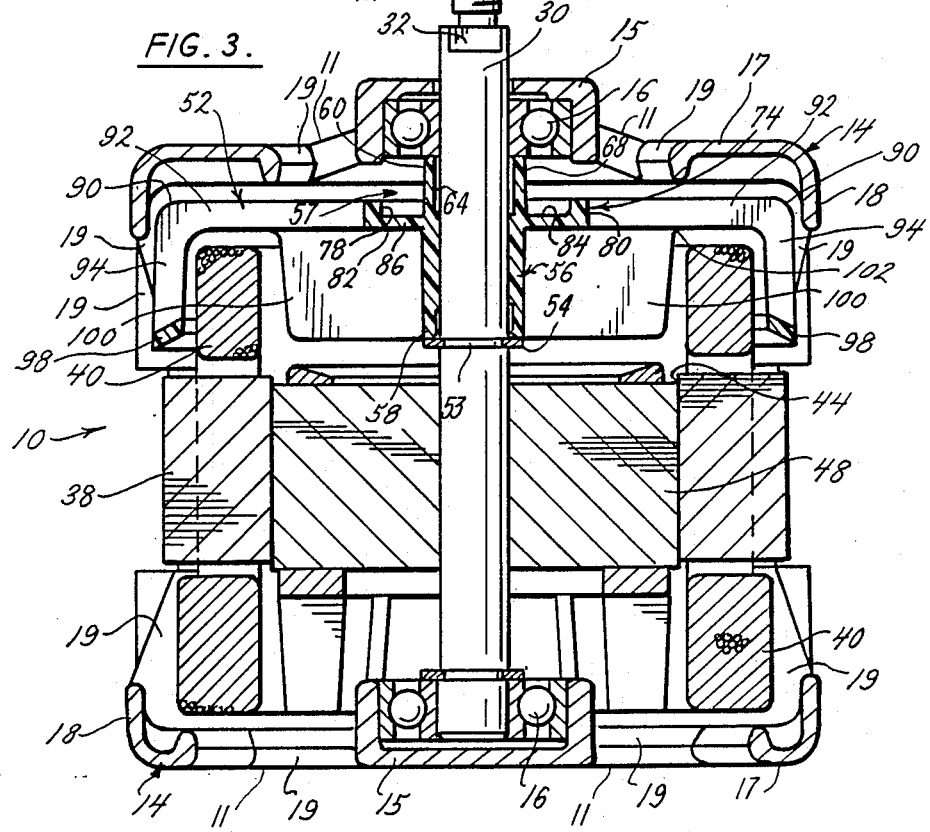
FIG. 3 is a side section view of the invention taken along line 3—3 of FIG. 2.

A rotor shaft 30 extends from one endshield 14 of the motor 10 as can be seen in FIGS. 1 and 3. The outer end of the shaft has a reduce diameter threaded portion 34. The shaft 30 has opposing flats 32 (see FIG. 2) formed at the outer end of its constant diameter extending portion for a pulley (not shown) with corresponding paired flats to be keyed to the shaft. The mounting bracket 21, in addition to serving to mount the motor 10 to the associated washing machine structure acts, as a heat sink for heat transferred from the interior of the motor 10 and for heat conducted from connected elements of the motor assembly. In addition, the bracket provides a heat transfer path to the attached washing machine structure.

FIG. 3 shows the detailed inner relationships of the elements of the motor 10. Rotor shaft 30 extends through a rotor assembly 48 which is positioned in a rotor cavity 44. The shaft 30 is journaled in respective bearing assemblies 16 which are mounted within the respective bearing housings 15 at each end of the motor 10. The bearing housings 15 can be manufactured as integral parts of the endshields 14 at each end of the motor 10. Other construction techniques can be employed, if desired. The endshields 14 are attached to the opposite ends of the lamination stack of the stator 38. The rotor assembly 48 is mounted on the rotor shaft 30. The bearing assemblies 16 are contained in the bearing housings 15 so rotor assembly 48 is positioned properly in rotor cavity 44 within the stator assembly 38 and is thus constrained to rotate therewithin. The location of suitable stator windings 40 within the stator assembly 38 and the associated winding end turns are clearly shown in FIG. 3.

Before the endshield 14 is placed over the threaded end 34 of the rotor shaft 30, a snap ring 54 is inserted in an annular channel 53 formed in shaft 30 at a point just above the top of the rotor assembly 48, as viewed in FIG. 3. The snap ring 54 acts as a stop for one end 58 of a hub 56. The hub comprises part of a collar means 57 of a fan 52. The fan is inserted into motor 10 from the threaded end 34 of the shaft 30. Hub 56 has a generally uniform diameter outer surface 68. As shown in FIG. 5, the hub has a central, cylindrical section 70 of one diameter, an upper, cylindrical section 64 of a larger diameter, and, a lower, cylindrical section 71, which is also of a larger diameter. The transition from section 64 to section 70 is abrupt, while that from section 70 to section 71 is a gradual, tapering transition. The diameter of section 70 is such as to effect a press fit of the fan 52 upon the rotor shaft 30 and against snap ring 53. During motor assembly, after fan 52 is installed on shaft 30, the upper endshield 14 shown in FIG. 3 is installed over the threaded end 34 of the rotor shaft 30 until the bearing assembly 16 abuts upper end 60 of the fan hub 56. Referring to FIGS. 4–6, fan 52 comprises a set 89 of generally L-shaped blades 90 each of which begins at the outer cylindrical surface 68 of the hub 56. Each blade extends radially outwardly from the hub before turning downwardly and terminating circumferential rim 98. The outward leg of each blade 90 is indicated 92 and the downward leg 94. Fan 52 further comprises a second set 91 of generally L-shaped blades 93. The blades 93 of this second set also extend radially outwardly and are positioned between the blades 90 so to alternate with these blades. The blades 93 each begin at the outer cylindrical surface 80 of a collar 74 which is spaced radially outward of hub 56. Each blade 93 extends radially outward from the collar before turning downwardly and terminating at the rim 98. The space between each of the L-shaped blades 90 and 93, is open. Also, collar 74 has an inner cylindrical surface 78, an outer cylindrical surface 80 and lower and upper base surfaces 82 and 84, respectively, defined by a web 86 of material. Each L-shaped blade 90 comprising blade set 89 has a rectangular shaped blade or paddle 100 formed on the underside of the leg 94 of the blade. The paddle is integrally formed with the blade and extends radially from the hub 56 outwardly to an intermediate point 102 on the underside of the leg 94. The paddles also extend downwardly along the hub 56 to lower end 58 of the hub. Thus, the combination L-shaped blade 90 and rectangular shaped paddle 100 extend radially outward from the hub 56; whereas, the L-shaped blade 93 without the rectangular-shaped paddle, extends from the outer cylindrical surface 80 of the collar 74. This alternating arrangement of L-shaped blades 93 and combination L-shaped blades 90 and rectangular-shaped paddles 100 is best seen in FIG. 6. In all cases, the end of the short leg of each L-shaped blade 90 or 93 terminates at the rim 98. Each end for example end 96 shown in FIG. 5, is formed at a predetermined angle to the horizontal plane preferably about 60°, to define a duct for air flow as more fully set out in copending application Serial No. 229,923, filed Aug. 8, 1988, for MOTOR COOLING AND PARTICULATE TRAPPING STRUCTURE, by Barry M. Newberg, the disclosure of which is incorporated herein by reference.

The combination blades 90 alternating with the blades 93 makes possible the sweeping of the heated air mass from and about the stator windings 40 and the rotor assembly 48. This arrangement assures removal of heated air from within the motor by flow through the apertures 19 in the top wall 17 or side wall 18 of endshield 14 to the external environment. In an application such as a washing machine requiring the use of a reversing motor, that makes the cooling of such a motor possible.

In the preferred embodiment of the present invention, the endshields 14 are fabricated from cast aluminum. The fan is molded from a suitable plastic.

Numerous variations, within the scope of the attached claims, will be apparent to those skilled the the art in light of the preceding description and accompanying drawings. While certain materials were described as preferred, other materials may be used. Particular shapes described may vary in other embodiments of the inventions. Likewise, although dimensions or angles are described, those skilled in the art will recognize that changes may be made without departing from the scope of the appended claims. These variations are merely illustrative.

Having thus described the invention, what is claimed and desired to be secured by Letters Patent is:

1. A fan assembly for use in an electric motor having a stator assembly, a rotor assembly including a rotatable shaft, and an end shield attached to the motor and having air venting apertures therein, the assembly comprising:

collar means fitting over the shaft;
 a first set of blades extending radially outward from the collar means;
 a second set of blades also extending radially outward from the collar means, the blades of the first said set alternating with the blades of the second said set about the collar means; and,
 paddle means including blades attached to each of the blades comprising the first said set and extending radially outward from said collar means with the first said set to create a flow of air from inside the motor to the external environment through the air venting apertures.

2. The fan assembly of claim 1 wherein the collar means comprises a hub fitting over the shaft and a circumferential collar spaced radially outward from the hub.

3. The fan assembly of claim 2 wherein each blade of the first said set extends radially outward from the hub and each blade of the second said set extends radially outward from the collar.

4. The fan assembly of claim 3 wherein the blades comprising the paddle means extend radially outward from the hub.

5. The fan assembly of claim 4 wherein the distance a blade comprising the paddle means extends radially outward is less than the distance its associated blade of the first said set extends.

6. The fan assembly of claim 5 wherein each blade of the paddle means is integrally formed with its associated blade of the first said set of blades.

7. The fan assembly of claim 1 further comprising a circumferential rim to which the outer end of each blade of said first and said second sets of blades is attached.

8. The fan assembly of claim 7 wherein each blade of said first and second sets of blades is generally L-shaped with the longer leg being the leg extending radially outward from the collar means.

9. The fan assembly of claim 8 wherein the blades comprising the first and second sets are planar blades.

10. In an electric motor having a stator assembly and a rotor assembly, the rotor assembly including a rotatable shaft, ventilation means for removing heated air from inside the motor to the external motor environment comprising:
  a fan including collar means fitting over the shaft, first and second sets of blades extending radially outward from the collar means, the blades of the first said set alternating with the blades of the second said set, and paddle means comprising blades attached to each of the first said set of blades and extending radially outward from said collar means therewith; and,
  at least one end shield attached to the motor, said end shield having an end wall and a side wall each of which has a least one air venting aperture therein for heated air inside the motor the be driven by the fan blades through the venting apertures to the external environment.

11. The ventilation means of claim 10 further including a second end shield having air venting apertures therein attached to the other end of the motor.

12. A ventilated electric motor assembly comprising:
  a stator assembly having a hollow, cylindrically shaped cavity;
  a rotor assembly rotatably disposed within said cavity, the rotor assembly including an axially disposed rotatable shaft for rotating the rotor assembly;
  a first end shield and a second end shield, said end shields being attached to opposite ends of the stator assembly, each end shield having an end wall and a side wall each of which has an air venting aperture formed therein, and the first said end shield having a central opening therein through which one end of the rotor shaft extends; and,
  a fan mounted on the shaft inside the first end shield and adjacent one end of the rotor assembly to direct heated air to the air venting apertures in the end shield, said fan including collar means fitting about the shaft to mount the fan on the shaft, first and second sets of blades extending radially outward from the collar means with blades of the first said set alternating with those of the second said set, and paddle means comprising blades attached to each of the blades of said first set and extending radially outward from the collar means therewith.

13. The motor of claim 12 wherein the collar means comprises a hub fitting over the shaft and a circumferential collar spaced radially outward from the hub.

14. The motor of claim 13 wherein each blade of the first said set of blades extends radially outward from the hub and each blade of the second said set of blades extends radially outward from the collar.

15. The motor of claim 14 wherein each blade comprising the paddle means is integrally formed with its associated blade of the first said set of blades and extends outwardly from the hub a lesser distance than its associated blade.

16. The motor of claim 12 wherein the fan further includes a circumferential rim to which the outer end of each blade of said first and second sets of blades is attached.

17. The motor of claim 16 wherein the blades comprising the first and second sets of blades are L-shaped with the longer leg being the leg extending radially outwardly from the collar means.

* * * * *